Jan. 5, 1937. E. RICHTER 2,066,576
SHOCK ABSORBER
Filed Nov. 21, 1934
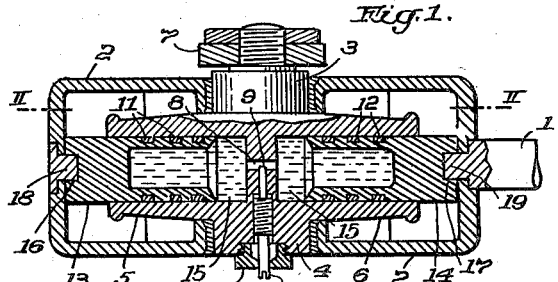
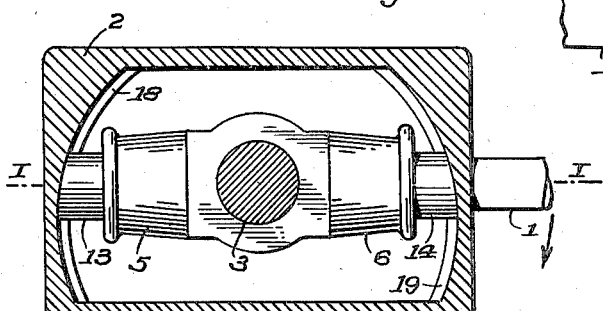
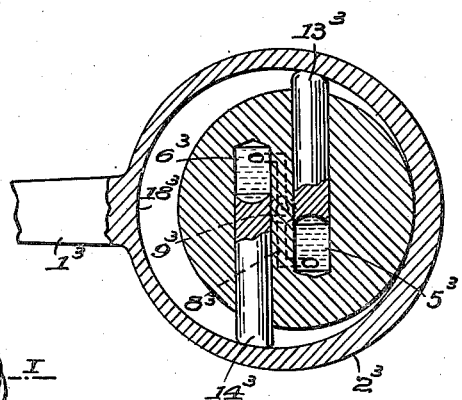
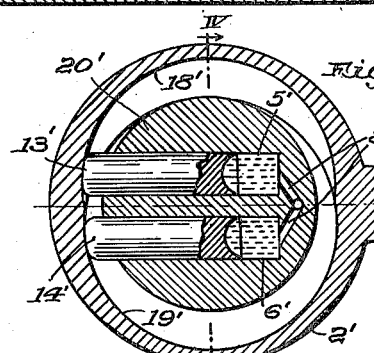
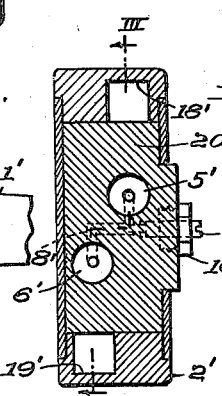
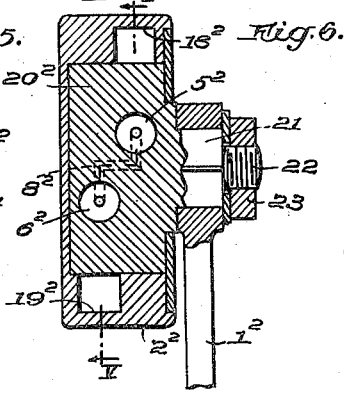
Inventor:
Ewald Richter
by
Paul Fuchsland
Attorney Patented Jan. 5, 1937

2,066,576

UNITED STATES PATENT OFFICE 2,066,576

SHOCK ABSORBER

Ewald Richter, Senftenberg, Niederlausitz, Germany

Application November 21, 1934, Serial No. 754,079
In Germany November 28, 1933

9 Claims. (Cl. 188—88)

This invention relates to improvements in shock-absorbers.

In the liquid-shock-absorbers hitherto known having pistons movable in two cylinders the latter are arranged relatively movable with the casing surrounding them and both pistons are forcibly controlled within the cylinders whereby a relatively troublesome and multiplicious and therefore expensive construction of the cylinder system and the pistons and their drive is entailed, and also very long connecting channels provided with valves for passing the liquid from one cylinder to the other are required.

These drawbacks are avoided by the shock-absorber according to the present invention which is distinguished from the shock-absorbers hitherto known by an extremely simple construction of the two cylinders and the pistons, the provision of valves in the channel connecting the cylinders being wholly avoided. The novel feature of the invention substantially consists in that the pistons move in two stationary cylinders separated by a partition and are controlled by the inner sliding surface of the shock-absorber casing which surface is disposed eccentrically to the transverse axis of the two cylinders and is moved by the shock action of the vehicle or the like.

The shock imparted to the vehicle is hereby, strictly speaking, only transferred to the one piston and displaces the latter, whereby the liquid contained in its cylinder is compelled to flow into the other cylinder and the piston in the latter is moved outwardly up to the corresponding sliding surface of the shock-absorber casing. In this way the shock is absorbed by the displaced liquid only, whereby a very soft absorption and breakage of the shock is attained and a hard action of the shock is avoided.

A further essential advantage of the liquid-shock-absorber according to the present invention consists in that, owing to the control of the one piston being effected by the eccentric inner sliding surface of the shock-absorber casing and the gradual movement of the piston thereby produced, the shock does not act by jerks and does not exert a corresponding return-shock, but runs out softly from the first to the last point of its way, the increasing resistance of the liquid preventing a hard deflection, whereas the action of a shock in the liquid-shock-absorbers hitherto used of which both pistons are driven simultaneously and forcibly by a crank or angular lever is considerably harder and more sudden.

The liquid-shock-absorber according to the present invention is preferably built up in such a manner that for governing both pistons inside the shock-absorber casing eccentric guiding ribs or grooves are provided which act like a wedge or feather key upon the correspondingly shaped heads of the pistons and that further in the partition between the two cylinders a connecting channel adjustable from without as to its cross-section is provided.

A further feature of the invention consists in that the cylinders of the two pistons may alternatively be arranged one besides or above the other or at an angle of 90°, for instance, or may be movable or rotatable, the casing surrounding the cylinders including the governing ribs being stationary.

The invention is illustrated by way of example in the annexed drawing in which

Fig. 1 is a cross-sectional view on the line I—I of Fig. 2;

Fig. 2 is a cross-sectional view on the line II—II of Fig. 1.

Figs. 3 and 4 show a modification in the arrangement of the cylinders with respect to each other; Fig. 3 is a cross-sectional view taken along the line III—III of Fig. 4, and Fig. 4 is a cross-sectional view taken along the line IV—IV of Fig. 3.

Figs. 5 and 6 show another modification of the arrangement of the cylinders; Fig. 5 being a cross-sectional view taken along the line V—V of Fig. 6, and Fig. 6 a cross-sectional view taken along the line VI—VI of Fig. 5.

Fig. 7 is a cross-sectional view of a third modification of the arrangement of the cylinders.

In the casing 2 provided with one or two levers 1 the two cylinders 5, 6 are united integrally and support by two pivots 3, 4 the casing in such a manner that an extension of the pivot 3 is firmly attached to the vehicle frame by means of a piece 7 forming part of the frame, and the casing 2 may be rotated about the pivots 3 and 4, the cylinders being stationary. The cylinders are separated by a partition and communicate with one another by the nozzle-like port 8 provided in this partition. The opening of the port 8 may be regulated by a set-screw 9. For this purpose the screw 9 is conducted outwardly through the pivot 4 and is tightened in the casing 2 by a stuffing-box 10. In the cylinders 5 and 6 the pistons 13 and 14 provided with piston rings 11 and 12 are supported capable of being displaced. To increase the volume of the oil-filling the pistons are made hollow. Into the front end of the pistons 13, 14 projecting out of the cylinders 5, 6 grooves 16 and 17 are cut into which the governing ribs 18, 19 engage which may be made integral with the casing 2 or may be formed separately as shown in Fig. 1. These governing ribs 18, 19 are eccentrically disposed in view of the journals 3 and 4 and so long that the casing 2 when turned about the journals may describe an angle of approximately 90°.

In the modification shown in Figs. 3 and 4 the cylinders $5^1$ and $6^1$ disposed in a block $20^1$ in staggered position one above the other, are separated by a partition and communicate by a port $8^1$ the cross-sectional area of which may be adjusted by the set screw 9 which is tightened by the stuffing box 10. The pistons $13^1$ and $14^1$ are controlled by the eccentric guiding surfaces $18^1$ and $19^1$ in the rotary casing $2^1$.

In the modification shown in Figs. 5 and 6, the casing $2^2$ is stationary and the lever $1^2$ is mounted on the cylinder structure $20^2$. The cylinders $5^2$ and $6^2$ are arranged to form an angle, being separated by a partition and communicating by the port $8^2$, the cross-sectional area of which may be varied by means of a set-screw. The pistons $13^2$ and $14^2$ are controlled by the guiding faces $18^2$ and $19^2$. The casing $2^2$ is rigidly mounted at, for instance, the frame of the vehicle by bolts or screws passing through the holes 24. The block $20^2$ is provided with a square part 21 and a threaded part 22, on which the nut 23 is screwed for fastening the lever $1^2$.

In the modification shown in Fig. 7 the cylinders $5^3$ and $6^3$, disposed in the block $20^3$ besides one another, are separated by a partition, and communicate by the port $8^3$ the cross-sectional area may be adjusted by the set-screw $9^3$. In this case the bores $5^3$ and $6^3$ in the cylinders are located at different sides of the block $20^3$, the pistons $13^3$ and $14^3$ being only controlled by an eccentric guiding surface $18^3$ of the rotary casing $2^3$ in such a manner that, for instance, when the piston $13^3$ is forced by the movement of the lever $1^3$ to the inside, the piston $14^3$ can be shifted to the same extent to the outside and vice versa.

The shock-absorber according to the present invention acts as follows:

When a shock causes the lever 1 to move in the direction of the arrow (Fig. 2), the casing 2 follows this action and is turned about the pivots 3 and 4 of the double cylinder 5, 6. Owing to the eccentric disposition of the governing ribs 18, 19 in view of the pivots 3, 4, the piston 14 is forced backwards in its cylinder 6 by the rotation of the casing 2 by means of the governing rib 19, the oil 15 contained in the cylinder 6 offering resistance to this stroke of the piston and thereby being forced through the port 8 into the cylinder 5 in form of a jet the diameter of which corresponds to the opening of the port. In this way the more or less strong resistance of the oil is in accordance with the rate of flow of the oil in the port 8, and the shock imparted to the lever 1 is correspondingly absorbed. The oil flowing over into the cylinder 5 displaces the piston 13 the stroke of which is limited by its governing rib 18. By this forcible guiding of the piston 13 in its end position a constant stroke of both pistons 13, 14 and thereby a soft absorption of the shock is attained. When a shock rotates the lever 1 in the direction of the arrow, the casing rotates around the pivots 3 and 4 and the pistons 13, 14 which are held stationary slide, relative to the rotating casing, in a direction opposite that of the arrow on the governing ribs 18 and 19 along the rotating casing 2, the outward displacement of the second piston merely being effected by the oil entering its cylinder, whereby an extremely soft brakage of the shock is attained. By a shock striking the lever 1 in the opposite direction the same effect with opposite strokes of the pistons 13 and 14 is obtained.

The liquid-shock-absorber according to this invention is especially suitable for motor cars. However it may be correspondingly used for other machineries in which shocks or other excessive stresses are to be compensated or reduced to nought by brakage.

I claim:—

1. In a shock-absorber, especially for motorcars, the combination of two cylinders mounted by journals in a casing, a perforated partition between the said cylinders to allow the liquid to flow directly and freely from one cylinder into the other, guiding surfaces forming part of the inner walls of the said casing, said surfaces being curved eccentrically with respect to the axis of the said journals, and pistons in the cylinders contacting the said guiding surfaces.

2. In a shock-absorber, especially for motorcars, the combination of two cylinders mounted by journals in a casing, a perforated partition between the said cylinders to allow the liquid to flow directly and freely from one cylinder into the other, guiding ribs formed on the inner walls of the said casing being curved eccentrically with respect to the axis of the said journals, and pistons in the cylinders grooved at their projecting ends and engaging the said ribs.

3. In a shock-absorber, especially for motorcars, the combination of two cylinders mounted by journals in a casing, a perforated partition between the said cylinders to allow the liquid to flow directly and freely from one cylinder into the other, guiding grooves formed in the inner walls of the said casing being curved eccentrically with respect to the axis of the said journals, and pistons in the cylinders carrying ribs at their projecting ends and engaging the said grooves.

4. In a shock-absorber, especially for motorcars, the combination of two cylinders, mounted by journals in a casing, a perforated partition between the said cylinders to allow the liquid to flow directly and freely from one cylinder into the other, means for varying the area of the perforation, guiding surfaces forming part of the inner walls of the said casing, said surfaces being curved eccentrically with respect to the axis of the said journals, and pistons in the cylinders contacting the said guiding surfaces.

5. A shock-absorber in accordance with claim 1, in which the cylinders are positioned one besides the other.

6. A shock-absorber in accordance with claim 1, in which the cylinders are positioned one above the other.

7. A shock-absorber in accordance with claim 1, in which the cylinders are positioned so as to form an angle.

8. A shock-absorber in accordance with claim 1, in which the cylinders are stationary and the casing movable.

9. A shock-absorber in accordance with claim 1, in which the cylinders are movable and the casing stationary.

EWALD RICHTER.